United States Patent
Fang et al.

(10) Patent No.: US 11,061,653 B2
(45) Date of Patent: Jul. 13, 2021

(54) DYNAMIC COMPILING FOR CONDITIONAL STATEMENTS DURING EXECUTION

(71) Applicant: International Business Machines Corporation, Armonk, NY (US)

(72) Inventors: Wu Song Fang, Beijing (CN); Li Xiang, Beijing (CN); Yuan Li, Beijing (CN); Ren Fu Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/668,531

(22) Filed: Oct. 30, 2019

(65) Prior Publication Data

US 2021/0132923 A1   May 6, 2021

(51) Int. Cl.
*G06F 8/41* (2018.01)
*G06F 9/30* (2018.01)

(52) U.S. Cl.
CPC ........ *G06F 8/4441* (2013.01); *G06F 9/30058* (2013.01)

(58) Field of Classification Search
CPC ............................ G06F 8/4441; G06F 9/30058
USPC ................................................. 717/140–151
See application file for complete search history.

(56) References Cited

U.S. PATENT DOCUMENTS

| | | | | |
|---|---|---|---|---|
| 5,293,631 A | * | 3/1994 | Rau | G06F 8/445 717/146 |
| 6,427,234 B1 | | 7/2002 | Chambers | |
| 6,546,550 B1 | * | 4/2003 | Ogata | G06F 9/45504 712/233 |
| 6,622,300 B1 | * | 9/2003 | Krishnaswamy | G06F 9/45525 717/130 |
| 7,107,585 B2 | * | 9/2006 | Berent | G06F 8/447 714/E11.205 |
| 7,120,898 B2 | * | 10/2006 | Grover | G06F 8/20 717/114 |
| 7,366,914 B2 | * | 4/2008 | Graunke | G06F 21/14 713/190 |

(Continued)

OTHER PUBLICATIONS

Auslander et al, "Fast, Effective Dynamic Compilation", ACM, pp. 149-159 (Year: 1996).*

(Continued)

*Primary Examiner* — Anil Khatri
(74) *Attorney, Agent, or Firm* — Christopher M. Pignato

(57) ABSTRACT

Implementations of the present disclosure relate a method, system and computer program products that dynamically compile conditional statements. According to the method, a first number of times that a first conditional statement of a plurality of conditional statements has been satisfied during execution of the plurality of conditional statements for a time period is obtained, wherein the plurality of conditional statements are compiled in a first order during the execution. Based on the first number of times and the first order, a determination is made whether the plurality of conditional statements are to be reordered. In response to a determination that the plurality of conditional statements are to be reordered, a second order of the plurality of conditional statements is determined, wherein the second order being different from the first order. The plurality of conditional statements are then compiled in the second order.

20 Claims, 8 Drawing Sheets

(56) References Cited

U.S. PATENT DOCUMENTS

| | | | | |
|---|---|---|---|---|
| 7,493,607 | B2* | 2/2009 | Moritz | G06F 1/32 717/151 |
| 7,539,982 | B2* | 5/2009 | Stuart | G06F 16/80 717/140 |
| 7,921,418 | B2* | 4/2011 | Nair | G06F 8/443 717/151 |
| 7,966,610 | B2* | 6/2011 | Lin | G06F 8/34 717/153 |
| 8,136,103 | B2* | 3/2012 | Cascaval | G06F 8/4442 717/145 |
| 8,448,140 | B2* | 5/2013 | Isshiki | G06F 11/3447 717/124 |
| 8,539,464 | B2* | 9/2013 | Partridge | G06F 9/4552 717/148 |
| 8,561,043 | B2* | 10/2013 | Ayguade | G06F 8/4442 717/151 |
| 8,769,511 | B2* | 7/2014 | Gal | G06F 9/45516 717/148 |
| 8,793,675 | B2* | 7/2014 | Lin | G06F 8/456 717/160 |
| 9,134,977 | B2* | 9/2015 | Baron | G06F 8/443 |
| 9,223,554 | B1* | 12/2015 | Lawson | G06F 8/54 |
| 9,471,371 | B2* | 10/2016 | Busaba | G06F 9/5044 |
| 10,303,449 | B2* | 5/2019 | Goetz | G06F 8/41 |
| 10,691,489 | B2* | 6/2020 | Barsness | G06F 9/4881 |
| 2013/0332710 | A1 | 12/2013 | Kruglick | |
| 2014/0289716 | A1 | 9/2014 | Adl-Tabatabai | |

OTHER PUBLICATIONS

August et al, "Architectural Support for Compiler-Synthesized Dynamic Branch Prediction Strategies: Rationale and Initial Results", IEEE, pp. 84-93 (Year: 1997).*

Suganuma et al, "A Dynamic Optimization Framework for a Java Just-in-Time Compiler", ACM, pp. 180-194 (Year: 2001).*

Gilgoric et al, "Automated Migration of Build Scripts using Dynamic Analysis and Search-Based Refactoring", ACM, pp. 599-616 (Year: 2014).*

Patros et al, "Dynamically Compiled Artifact Sharing for Clouds", IEEE, pp. 290-300 (Year: 2017).*

Gilgoric et al, "Practical Regression Test Selection with Dynamic File Dependencies", ACM, pp. 211-222 (Year: 2015).*

Huang et al, "File-Based Sharing For Dynamically Compiled Code On Dalvik Virtual Machine", IEEE, pp. 489-494 (Year: 2010).*

Chang et al, "The Impact of Optional Type Information on JIT Compilation of Dynamically Typed Languages", ACM, pp. 13-24 (Year: 2011).*

Chung et al, "Improvement of Compiled Instruction Set Simulator by Increasing Flexibility and Reducing Compile Time", IEEE, pp. 1-7 (Year: 2007).*

Willams et al., "Dynamic Interpretation for Dynamic Scripting Languages", CGO'10, Apr. 24-28, 2010, Toronto, Ontario, Canada, Copyright © 2010 ACM 978-1-60558-635—Sep. 10, 2004, 10 pages.

Mell et al., "The NIST Definition of Cloud Computing", Recommendations of the National Institute of Standards and Technology, NIST Special Publication 800-145, Sep. 2011, 7 pages.

* cited by examiner

DYNAMIC COMPILING FOR CONDITIONAL STATEMENTS DURING EXECUTION

BACKGROUND

The present disclosure relates to the field of computer technology, and more specifically, to dynamic compiling for conditional statements.

Conditional statements (sometimes referred to as conditional statements, conditional expressions or conditional constructs) are features of a programming language which perform different computations or actions depending on whether a programmer-specified Boolean condition is evaluated to be true or false. Conditional statements can be described as a set of rules performed if certain conditions are met. Often, the condition can be written as an if-then logical statement that modifies how code is executed, wherein if a condition is met, an action is performed.

SUMMARY

According to one embodiment of the present disclosure, there is provided a computer-implemented method. According to the method, a first number of times that a first conditional statement of a plurality of conditional statements has been satisfied during execution of the plurality of conditional statements for a time period is obtained, wherein the plurality of conditional statements are compiled in a first order during the execution. It is then determined, based on the first number of times and the first order, whether the plurality of conditional statements are to be reordered. In response to a determination that the plurality of conditional statements are to be reordered, a second order of the plurality of conditional statements is determined, wherein the second order being different from the first order. The plurality of conditional statements are then compiled in the second order.

According to another embodiment of the present disclosure, there is provided a computer-implemented system. The system may include one or more processors; a memory coupled to at least one of the one or more processors; a set of computer program instructions stored in the memory and executed by at least one of the one or more processors to perform actions of the above method.

In yet another aspect of the present invention, a computer program product is disclosed. The computer program product comprises a computer readable storage medium having program instructions embodied therewith. When executed on one or more processors, the instructions may cause the one or more processors to perform the above method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
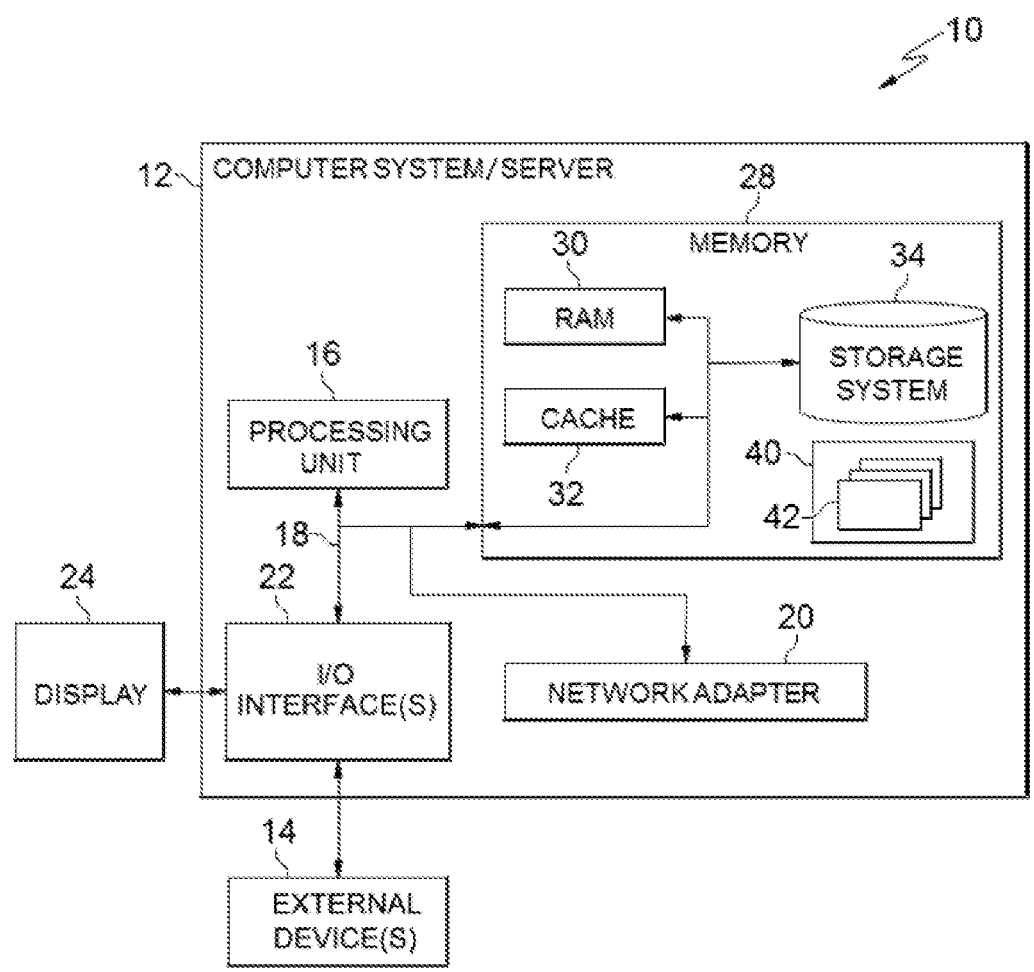
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules 42, being executed by a computer system. Generally, program modules 42 may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules 42 may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules 42 that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network adapter 20, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
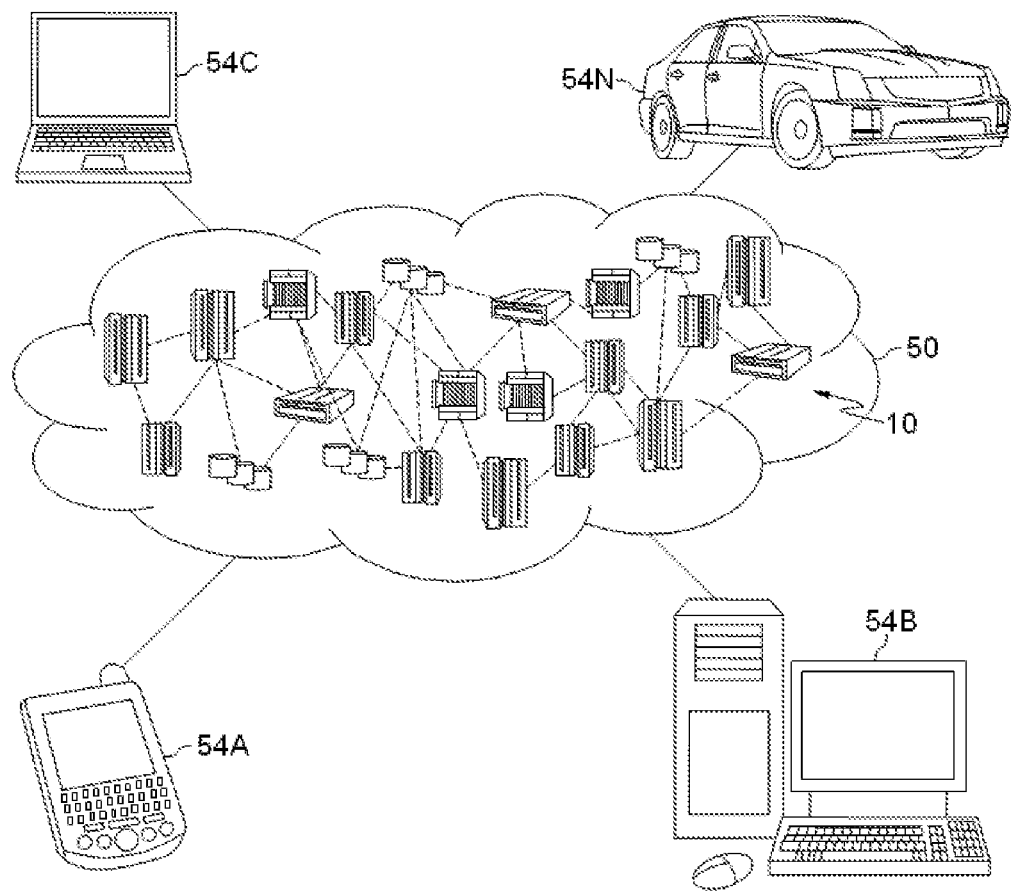
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
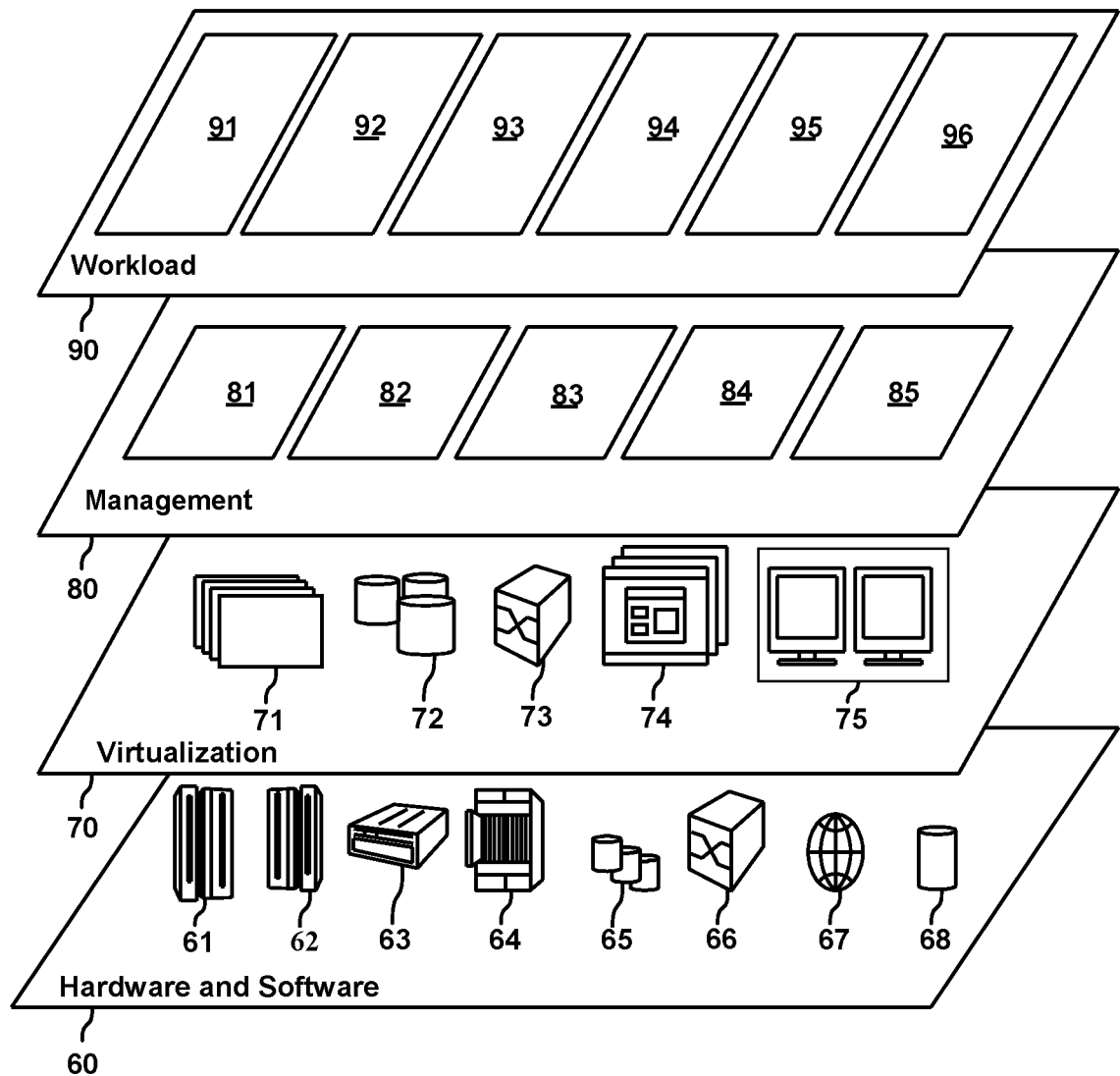
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment 50. Metering and Pricing 82 provide cost tracking as resources are utilized within the cloud computing environment 50, and billing or invoicing for consumption of these resources. In one example, these resources may include application software licenses. Security provides identity verification for cloud consumers and tasks, as well as protection for data and other resources. User portal 83 provides access to the cloud computing environment 50 for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment 50 may be utilized. Examples of workloads and functions which may be provided from this layer include: mapping and navigation 91; software development and lifecycle management 92; virtual classroom education delivery 93; data analytics processing 94; transaction processing 95; and dynamic compiling 96. The dynamic compiling may implement the solution of dynamically compiling a plurality of conditional statements based on the number of times that a conditional statement has been satisfied during the execution of the plurality of conditional statements for a time period.

To improve efficiency of processing messages, a developer may typically design a number of customized criteria for automatically performing corresponding actions of particular messages. For example, a developer may define a list of conditional statements and the actions corresponding to each of the list of conditional statements. When one of the lists of conditional statements is satisfied, the corresponding action can be automatically performed. However, the performance for processing a message to determine a corresponding action may depend on a relative position of the corresponding conditional statement in the list. Upon receiving a message corresponding to a conditional statement which locates at a latter position in the list, some unrelated conditional statement would be traversed before targeting the corresponding conditional statement during the processing. As a result, a time required for processing the message would be increased and the performance for message processing may therefore be decreased. Therefore, it would be advantageous to dynamically compile the conditional statements.

In a message processing system, an action to be performed for an incoming message may be automatically determined by defining a list of conditional statements and corresponding actions thereof. The conditional statement may be defined for determining whether the incoming message satisfies the corresponding condition. For example, conditional statements may be defined as below:

```
UPON (MSGID='A1')
REVISE ('CR HR' COLOR)
UPON (MSGID='Z1')
REVIESE ('CP' COLOR)
```
According to the example above, the conditional statement may be configured to compare the identity of an incoming message with "A1" and "Z1", and then perform corresponding action.

In some cases, the list of conditional statements and the corresponding actions may be defined for example in a script file. The message processing system may process the incoming messages by executing a machine-executable program compiled from the script file. The term "compilation" herein refers to a process of converting a source program written in a source language into a machine-executable program, for example, a binary file. During the execution of the machine-executable program, the message processing system can traverse the conditional statements expressed in machine-executable language in sequence, identify the corresponding conational statement of an incoming message and then perform the corresponding action.

In some cases, for ease of reading, the user or developer may define a plurality of conditional statements in a script file according to an alphabetical order, and the script file can then be compiled into a machine-executable program based on the alphabetical order. In this case, if an incoming message satisfying a conditional statement for example starting with a letter "Z" in the plurality of conditional statements is to be processed, a number of unrelated conditional statements, for example conditional statements starting with letters "A" to "Y", would be traversed before targeting the corresponding conditional statement starting with the letter "Z". Therefore, if most the incoming messages are to satisfy the conditional statements locating at latter positions in the alphabetical order of compilation, an average time for targeting the corresponding conditional statement during the execution would be significantly increased, thereby decreasing the performance of message processing.

In order to at least partially solve one or more of the above problems and other potential problems, example embodiments of the present disclosure propose a solution for dynamically compiling a plurality of conditional statements. In general, a first number of times that a first conditional statement of a plurality of conditional statements has been satisfied during execution of the plurality of conditional statements for a time period is obtained. The plurality of conditional statements are compiled in a first order during the execution. The plurality of the conditional statement may be reordered, as determined by the message processing system, based on the first number of times and the first order. In response to determining that the plurality of conditional statements are to be reordered, a second order of the plurality of conditional statements is determined, wherein the second order being different from the first order. The plurality of conditional statements may be compiled in the second order. In this way, the efficiency for processing incoming messages with the plurality of conditional statements would be improved. It should be noted that the plurality of conditional statements discussed herein are independent of each other, and the order for compiling the plurality of conditional statements can be adjusted without affecting operation of the plurality of conditional statements.

Figure 4:
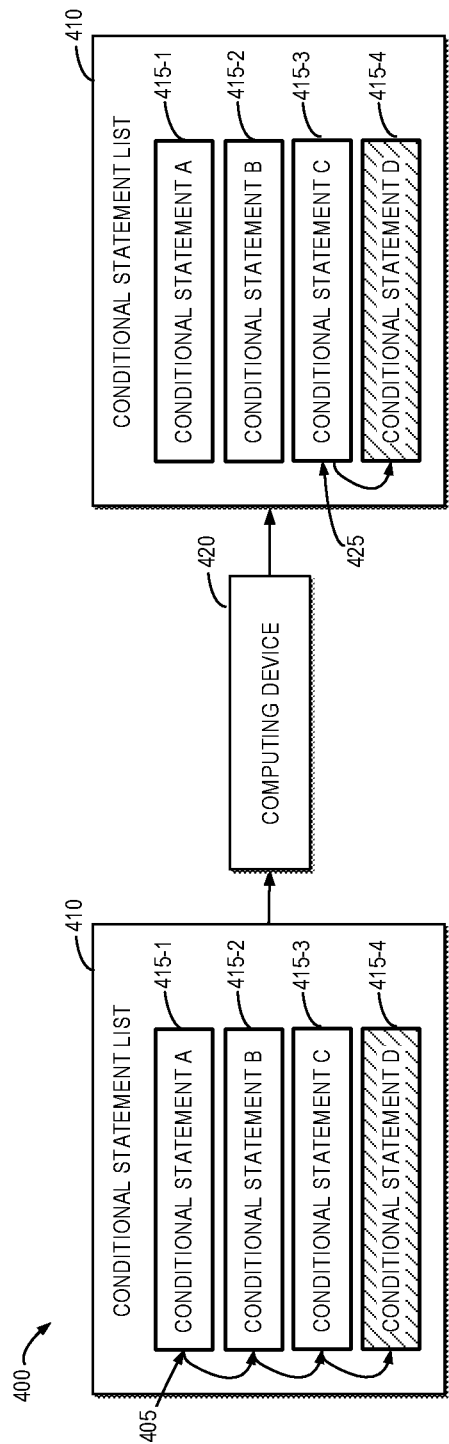
FIG. 4 depicts an environment in which embodiments of the present disclosure can be implemented.

Reference is made to FIG. 4, which depicts an environment 400 in which embodiments of the present disclosure can be implemented. As shown in FIG. 4, the environment 400 comprises a computing device 420. The computing device 420 may receive from a user or developer a conditional statement list 410, which may be comprised of one or more conditional statements 415-1, 415-2, 415-3 and 415-4 (individually or jointly referred to as conditional statement 415). In some embodiments, a user or developer may, for example, upload to the computing device 420 a script file defining both the plurality of conditional statements 415 and corresponding actions to be performed. The conditional statements 415 can then be compiled into a machine-executable program by the computing device 420, according to an order in which the conditional statements are defined in the script file. Take FIG. 4 as an example, the order defined by the user or developer may be conditional statement A 415-1, conditional statement B 415-2, conditional statement C 415-3 and conditional statement D 415-4 in sequence. That is, during the execution of the machine-executable program compiled from the script file, the conditional statement ranking at the head among the plurality of conditional statements will be first traversed. For example, in a case that a message or a command 405 corresponding to the conditional statement D 415-4 is received, three unrelated conditional statements (conditional statement A 415-1, conditional statement B 415-2, and conditional statement C 415-3) locating preceding to the corresponding conditional statement D 415-4 will be traversed before the computing device 420 targets the corresponding conditional statement D 415-4.

In order to determine whether the plurality of conditional statements are to be reordered or not, the computing device 420 can obtain a first number of times that a first conditional statement of the plurality of conditional statements 415 has been satisfied during execution of the plurality of conditional statements 415 for a time period. In this time period, the plurality of conditional statements 415 are compiled in a first order during the execution. In the example shown in FIG. 4, the first order is defined as conditional statement A 415-1, conditional statement B 415-2, conditional statement C 415-3 and conditional statement D 415-4 in sequence.

For example, in some embodiments, the computing device 420 may obtain a number of times that each of the plurality of conditional statements 415 has been satisfied during a time period of the last week or last month. Alternatively, the computing device 420 may obtain a number of times that a particular conditional statement in the plurality of the conditional statements has been satisfied during the time period, such as, the conditional statement locating at the beginning or the end of the first order. The computing device 420 may also obtain a number of conditional statements which fall within a particular range in the first order, for example, a front or a rear half of the plurality of conditional statements in the first order.

The computing device 420 may then determine, based on the first number of times that the first conditional statement has been satisfied during the execution for the time period and the first order, whether the plurality of conditional statements are to be reordered. For example, if the first number of times indicates that most of the incoming messages, for example 70 percent of the messages, were corresponding to the conditional statement D 415-4 during the last week, the computing device 420 may determine that the plurality of conditional statements are required to be reordered. In another example, if the first conditional statement (e.g., the conditional statement A 415-1) locates at the beginning of the first order, the computing device 420 may determine that the plurality of conditional statements are to be reordered in a case the first number of times that the first conditional statement has been satisfied during the execution is relatively low.

Upon determining that the plurality of conditional statements are to be reordered, the computing device 420 can further determine a second order different from the first order for compiling the plurality of conditional statements 415. The computing device 420 can then compile the plurality of conditional statements 415 according to the second order. In some embodiments, the second order may be determined by ranking the plurality of conditional statements according to the number of times that each of the plurality of conditional statements has been satisfied during the execution. In the example as shown in FIG. 4, presuming that the number of times for conditional statement A 415-1, conditional statement B 415-2, conditional statement C 415-3 and conditional statement D 415-4 are 300, 200, 1000 and 500 respectively. In this case, the second order may be determined as conditional statement C 415-3, conditional statement D 415-4, conditional statement A 415-1 and conditional statement B 415-2 in sequence. After compiling the plurality of conditional statements according to the second order, upon receiving a message corresponding to the conditional statement D 415-4, only one unrelated conditional statement will be traversed before the computing device 420 targets the corresponding conditional statement D 415-4. By compiling the plurality of conditional statements based on the characteristics of the received messages during the time period, the performance for processing incoming messages will be significantly improved. The process for dynamically compiling the plurality of conditional statements will be discussed in detail with reference to FIG. 5.

Figure 5:
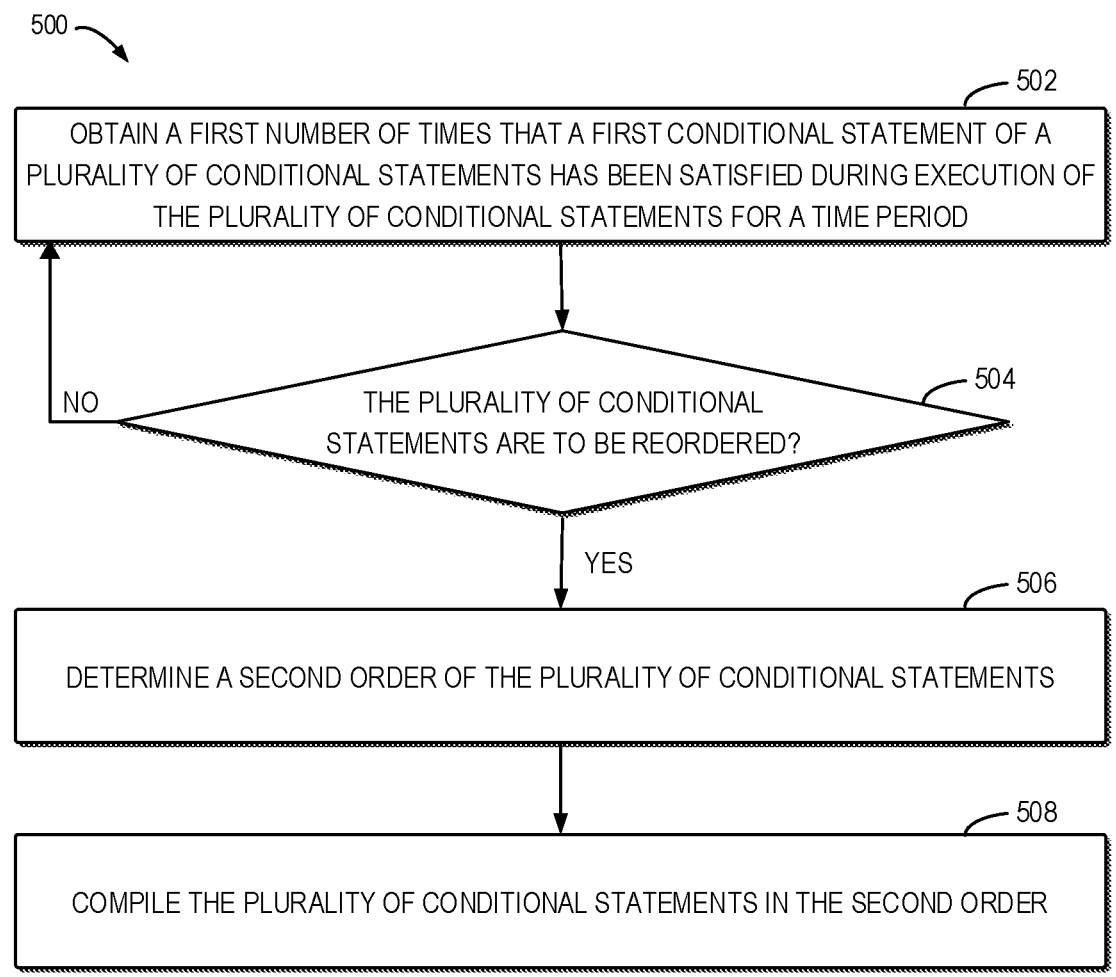
FIG. 5 depicts a flowchart of a method for dynamic compiling according to an embodiment of the present disclosure.

FIG. 5 illustrates a flowchart of a method 500 of dynamic compiling according to embodiments of the present disclosure. The method 500 can be implemented by the computing device 420 shown in FIG. 4. Acts involved in the method 500 will be described with reference to the environment 400 as shown in FIG. 4.

At block 502, the computing device 420 obtains a first number of times that a first conditional statement of a plurality of conditional statements 415 has been satisfied during execution of the plurality of conditional statements 415 for a time period, wherein the plurality of conditional statements are compiled in a first order during the execution. In some embodiments, as discussed above with reference to FIG. 4, the plurality of conditional statements 415 may be received from a user or developer as a script file, which may define both a number of conditions associated with the messages or commands 405, 425 to be processed and the corresponding actions to be performed. For example, the script file may be written in a form of message revision table (MRT) or command revision table (CRT). By compiling the script file into a machine-executable program, the computing device 420 may automatically process the incoming messages or commands 405, 425 for performing corresponding actions.

In some embodiments, during executing the machine-executable program for the time period, the computing device 420 may record a number of times for each conditional statement 415 by incrementing the respective number of times each time the conditional statement 415 is satisfied during the time period. In another example, the computing device 420 may only obtain a number of times associated with a particular conditional statement, such as, the conditional statement located at the head of the first order or the conditional statement located at the end of the first order. In a further example, the computing device 420 may also obtain a number of conditional statements which fall within a particular range of the first order, for example, the first half of the conditional statements 415 in the first order. In some embodiments, which of the plurality of conditional statements 415 are to be monitored may also be configurable by the user or developer. For example, the user or developer may define a range such as "the first 40 percent of the plurality of conditional statements 415 in the first order", and the computing device 420 may then monitor and record the number of times that the first 40 percent of the plurality of conditional statements 415 in the first order have been satisfied during the execution. By recording the first number of times that the first conditional statement (for example, conditional statement A 415-1) has been satisfied, it may then be determined whether the plurality of conditional statements 415 work efficiently during the execution.

Additionally, the time period for monitoring the execution of the plurality of conditional statements 415 may be a default time period, for example, a past month or a past week. In some other embodiments, the time period may be also configurable by the user or developer, thereby allowing the user or developer to dynamically modify the time period according to practice.

At block 504, the computing device 420 determines whether the plurality of conditional statements 415 are to be reordered based on the first number of times conditional statements 415 have been satisfied during execution of the plurality of conditional statements within the first order during a time period. In some embodiments, the computing device 420 may determine whether the plurality of conditionals statement 415 are to be reordered based on the number of times that one or more conditional statements 415 which are in front positions in the plurality of conditional statements 415 in the first order have been satisfied during the execution. For example, the computing device 420 may obtain the number of times that the front half of the plurality of conditional statements (i.e. 415-1 and 415-2) in the first order have been satisfied during the execution.

Taking FIG. 4 as an example, the determination may be based on the number of times that conditional statement A 415-1 and conditional statement B 415-2 have been satisfied during the execution. In an exemplary case where the number of times that the conditional statement A 415-1 has been satisfied and the number of times that the conditional statement B 415-2 has been satisfied indicate that the plurality of conditional statements 415 work inefficiently during the execution, the computing device 420 determines to reorder the plurality of conditional statements 415.

Figure 6:
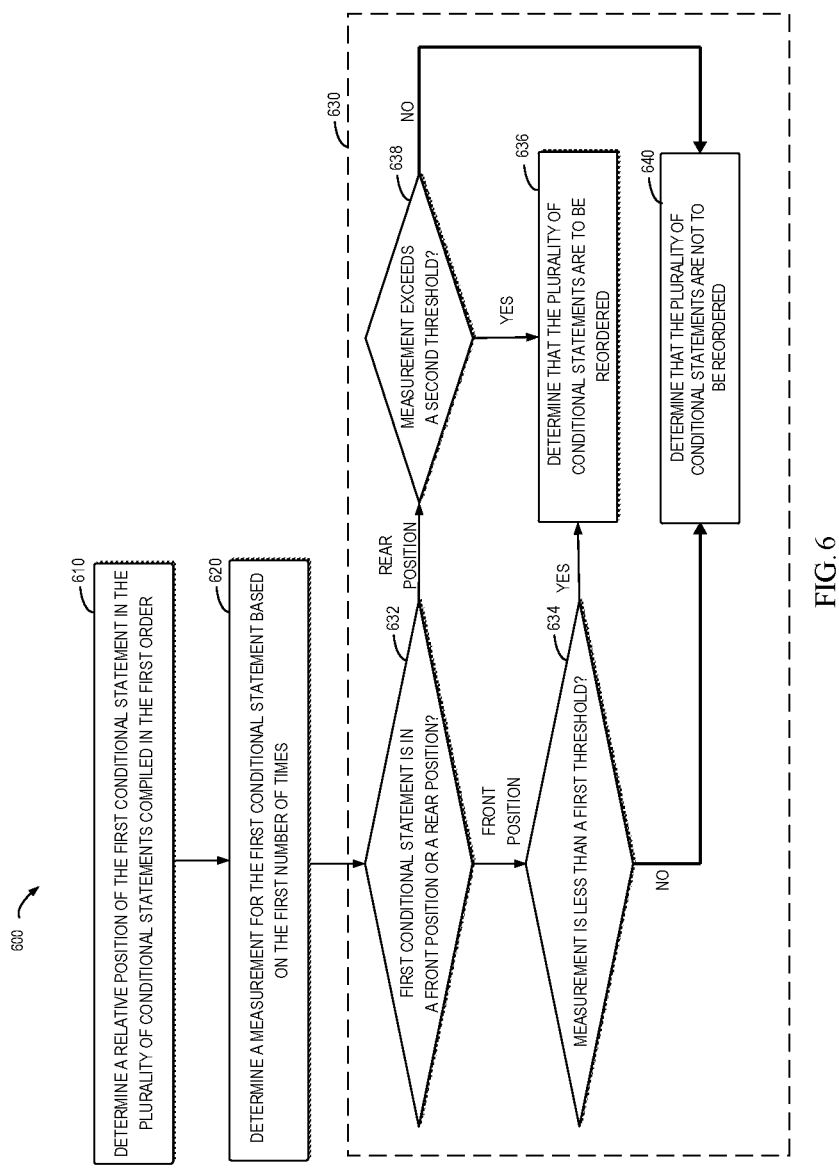
FIG. 6 depicts a flowchart of a method for determining whether the plurality of conditional statements are to be reordered according to an embodiment of the present disclosure.

The step of block 504 will now be described in detail with reference to FIG. 6, which depicts a flowchart of a method 600 for determining whether the plurality of conditional statements 415 are to be reordered during the determination made in block 504 according to an embodiment of the present disclosure. As shown in FIG. 6, at block 610, the computing device 420 may determine a relative position of the first conditional statement in the plurality of conditional statements 415 in the first order. In some embodiments, the relative position may be determined by obtaining a first position of the first conditional statement in the first order and then comparing the first position with a position of a beginning conditional statement in the plurality of conditional statements compiled in the first order. In response to determining that a distance between the first position and the position of the beginning conditional statement is below a first distance threshold, the computing device 420 may determine that the relative position is in a front position in the plurality of conditional statements 415 compiled in the first order.

Taking FIG. 4 as the example, a distance between a position of the conditional statement B 415-2 ($2^{nd}$ position) and a position of the beginning conditional statement A 415-1 ($1^{st}$ position) is 1, and the first distance threshold may for example be set as 2. In this case, the computing device 420 may determine that the conditional statement B 415-2 is in a front position, since the distance is below the first distance threshold.

In some other embodiments, the relative position may be determined by comparing the first position with a position of an end conditional statement in the plurality of conditional statements 415 compiled in the first order. In response to determining that a distance between the first position and the position of the end conditional statement is below a second distance threshold, the computing device 420 may determine that that the relative position is in a rear position in the plurality of conditional statements compiled in the first order.

Taking FIG. 4 as the example, a distance between a position of the conditional statement C 415-3 ($3^{rd}$ position) and a position of the end conditional statement D 415-4 ($4^{th}$ position) is 1, and the second distance threshold may for example be set as 2. In this case, the computing device 420 may determine that the conditional statement C 415-3 is in a rear position, since the distance is below the second distance threshold.

At bock 620, the computing device 420 may determine a measurement for the first conditional statement based on the first number of times. In some embodiments, the measurement comprises at least one of: a value of the first number of times, a frequency that the first conditional statement has been satisfied during the execution, or a ratio of the first number of times to a total number of times that the plurality of conditional statements 415 have been satisfied during the execution.

In the example as shown in FIG. 4, presuming that the number of times that conditional statement A 415-1, conditional statement B 415-2, conditional statement C 415-3 and conditional statement D 415-4 have been satisfied during the execution are 300, 200, 1000 and 500 respectively. In a case that the conditional statement A is selected to be the first conditional statement, the measurement for the first conditional statement may then be determined as the value (300) of the first number of times that the first conditional statement A 415-1 has been satisfied. In another example, if both the conditional statements A and B are selected to the first conditional statements, the measurement may be determined as the sum (300+200) of the number of times that conditional statement A 415-1 and conditional statement B 415-2 have been satisfied during the execution.

In some embodiments, the measurement for the first conditional statement may be determined by calculating a frequency that the first conditional statement has been satisfied during the execution. For example, the computing device 420 may determine, based on the first number of times and a length of the time period, the frequency that the first conditional statement has been satisfied during the execution. Similar to the number of times discussed above, the frequency may be determined as a frequency of a single first conditional statement or a sum of frequencies of two or more first conditional statements. Taking FIG. 4 as the example, the computing device 420 may determine a frequency of conditional statement A 415-1 based on the number of times (300) and the length of the time period (e.g., a week). In another example, the computing device 420 may determine a sum of frequencies of conditional statements A and B based on the sum of the numbers of times (300+200) and the length of the time period (e.g., a week).

In some further examples, the measurement may be determined by calculating a ratio of the first number of times to a total number of times that the plurality of conditional statements 415 have been satisfied during the execution. In particular, the computing device 420 may first determine a total number of times that the plurality of conditional statements 415 have been satisfied during the execution. For example, the computing device 420 may record the number of times that each of the plurality of conditional statements 415 has been satisfied during the execution and may then calculate the sum thereof. Alternatively, the computing device 420 may also record the total number of times by incrementing the total number of times each time any of the plurality of conditional statements 415 has been satisfied during the execution. Continuing the example as shown in FIG. 4, in a case that both the conditional statements A and B are selected as the first conditional statements, the ratio of the sum of conditional statements A and B (500) to the total number of the times (2000) is 25%.

At block 630, the computing device 420 may determine whether the plurality of conditional statements 415 are to be reordered, based on the relative position and the determined measurement. As shown in FIG. 6, at block 632, the computing device 420 may determine whether the first conditional statement is in a front position or a rear position. In response to determining that the first conditional statement is in front position, the method proceeds to block 634, where the computing device 420 may further determine whether the measurement is less than a first threshold. Typically, if a conditional statement which is in a front position has a relative low number of times, it may be determined that the performance of the execution of the plurality of conditional statements 415 during the execution is not good. In some embodiments, the first threshold may be preconfigured by the developer or the user.

In response to determining that the measurement is below the first threshold, the method proceeds to block 636, where the computing device 420 may determine that the plurality of the conditional statements 415 are to be reordered, otherwise, if the measurement of the first conditional state is above the first threshold, computer device 420 outputs a determination that the conditional statement should not be reordered and the method 600 proceeds to block 640 and determines that the plurality of conditional statements are not to be reordered. Likewise, if reordering is determined not to occur, method 500 may return from block 504 to block 502 and continue to calculate a number of times the plurality of conditional statements 415 have been satisfied during the execution of the plurality of conditional statements during the next time period being measured.

In some embodiments, the computing device 420 may compare a value of the first number of times that the first conditional statement has been satisfied during the execution with a predetermined threshold. In an example where the conditional statement A 415-1 is selected to be the first conditional statement, the computing device may compare the first number of times (300) with the predetermined threshold (e.g., 500), and may then determine that the plurality conditional statements are to be reordered since the first number of times is below the predetermined threshold.

In some other embodiments, the computing device 420 may compare the frequency that the first conditional statement has been satisfied during the execution with a frequency threshold. In an example where both the conditional statements A and B are selected to be the first conditional statements, the computing device 420 may compare a sum (500 per week) of the frequencies of conditional statements A and B with a predetermined frequency threshold (e.g., 1000 per week), and may then determine that the plurality conditional statements are to be reordered.

In some further embodiments, the computing device 420 may compare a ratio of the first number of times to a total number of times that the plurality of conditional statements have been satisfied during the execution with a ratio threshold. In an example where both the conditional statements A and B are selected to be the first conditional statements, the ratio of a sum (500) of the numbers of times of conditional statements A and B to the total number of times (2000) of the plurality of conditional statements is 25%. The computing device 420 may compare the ratio (e.g., 25%) with a predetermined ratio threshold (e.g., 70%), and may then determine that the plurality conditional statements are to be reordered.

As shown in FIG. 6, in response to determining that the first conditional statement is in a rear position, the method proceeds to block 638, where the computing device 420 may determine whether the measurement exceeds a second threshold. In response to a determination that the measurement exceeds the second threshold, the method proceeds to block 636. Otherwise, if the measurement is below the second threshold, reordering does not occur and block 504 in method 500 concludes in the determination that reordering does not need to be performed as indicated by block 640. The method 500 may proceed from block 504 back to block 502 wherein the computing device 420 continues to obtain a number of times that a first conditional statement has been satisfied during the execution of the plurality of conditional statements within the next time period being examined.

In some embodiments, the determination 504 may also be based on comparison between the first number of times with a number of times that a second conditional statement of the plurality of conditional statements 415 has been satisfied during the execution, wherein the second conditional statement is different from the first conditional statement.

Figure 7:
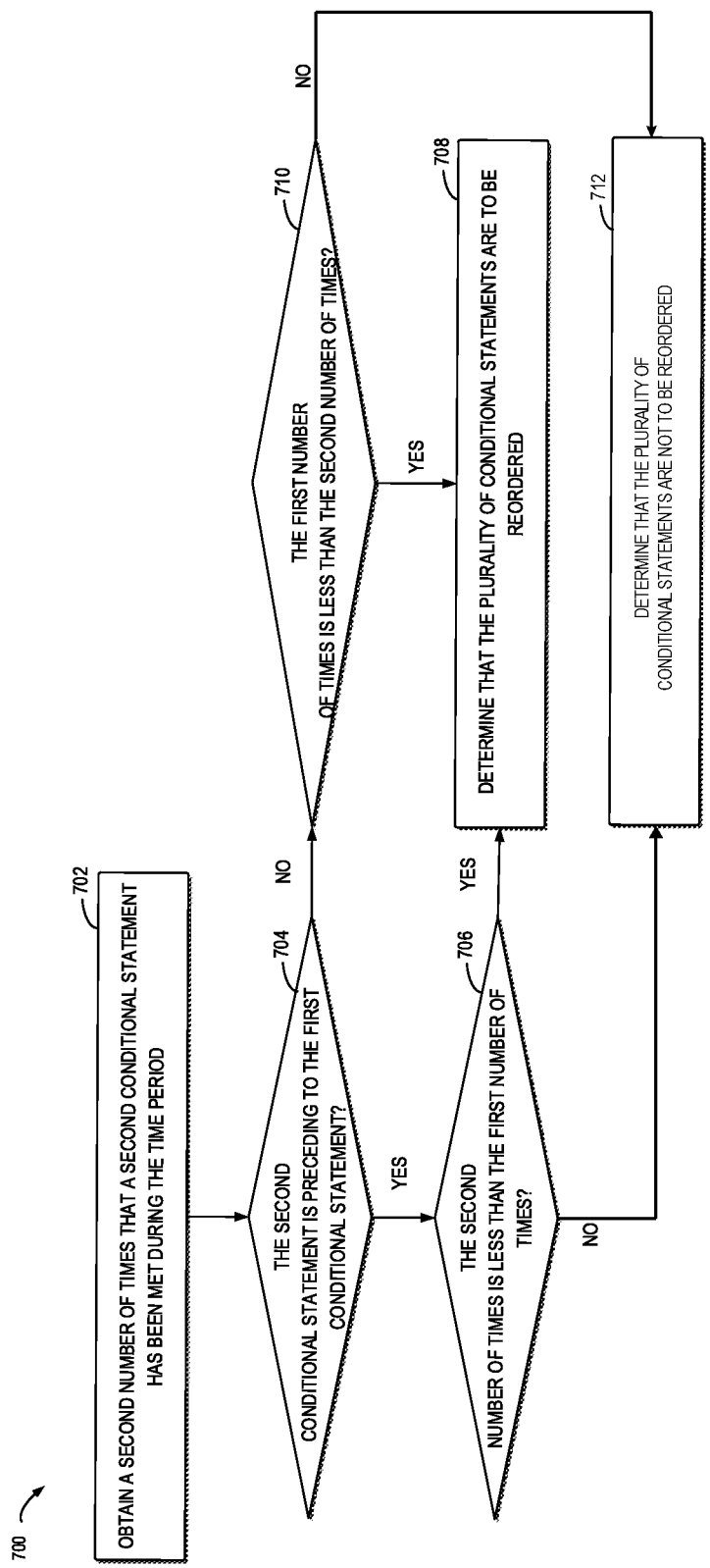
FIG. 7 depicts a flowchart of a method for determining whether the plurality of conditional statements are to be reordered according to another embodiment of the present disclosure.

The step of block 504 will now be described in detail with reference to FIG. 7, which depicts a flowchart of a method 700 for determining whether the plurality of conditional statements 415 are to be reordered according to an embodiment of the present disclosure. As shown in FIG. 7, at block 702, the computing device 420 may determine a second number of times that a second conditional statement has been satisfied during the execution, wherein the second conditional statement is different from the first conditional statements. In some embodiments, the second conditional statement may be determined as the conditional statement located at the head of the first order. In some embodiments, the second conditional statement may also be determined as the conditional statement locating at the end of the first order. Alternatively, the second conditional statement may be also randomly selected.

At block 704, the computing device 420 may determine whether the second conditional statement is preceding to the first conditional statement in the plurality of conditional statements compiled in the first order. In response to determining that the second conditional statement precedes the first conditional statement in the first order at block 704, the method proceeds to block 706, where the computing device 420 may determine whether the second number of times of the second conditional statement is less than the first number of times of the first conditional statement. In response to determining that the second number of times is less than the first number of times at block 706, the method proceeds to block 708, where the computing device 420 may determine that the plurality of conditional statements are to be reordered. Otherwise, the method 700 proceeds to block 712 wherein reordering is determined not to occur. Accordingly, since reordering is determined not to occur, method 500 proceeds from block 504 back to block 502 and the order of the plurality of conditional statements remains the same until a redetermination may be made at the next time period.

In response to determining that the first conditional statement precedes the second conditional statement in the first order at block 704, the method proceeds to block 710, where the computing device 420 may determine whether the first number of times is less than the second number of times. In response to determining that the first number of times is less than the second number of times at block 710, the method proceeds to block 708, where the computing device 420 may determine that the plurality of conditional statements are to be reordered. Otherwise, if the first number of times is greater than the second number of times, computing device 420 method 700 proceeds to block 712 wherein a determination not reorder the plurality of conditional statements is made. Moreover, since reordering is determined not to occur method 500 proceeds from block 504 back to block 502 and the order of the plurality of conditional statements may remain the same until a redetermination may be made during the next time period.

Continuing the example as shown in FIG. 4, for example, the conditional statement C 415-3 is selected to be the first conditional statement, and the conditional statement A 415-1 is selected to be the second conditional statement. In this case, the first number of times (1000) that the conditional statement C 415-3 has been satisfied during the execution is above the second number of times (300) that the conditional statement A 415-1 has been satisfied during the execution, and the conditional statement A 415-1 is preceding to the conditional statement C 415-3 in the first order. As a result, the computing device 420 may determine that the plurality of conditional statements 415 work inefficiently during the execution for the time period and are to be reordered.

Referring back to FIG. 5, in response to determining that the plurality of conditional statements are to be reordered at block 504, the method 500 proceeds to block 506, where the computing device 420 determines a second order of the plurality of conditional statements, wherein the second order is different from the first order. For example, the computing device 420 may determine a second order by simply moving a conditional statement with a lower number of times to a latter position in second order.

Figure 8:
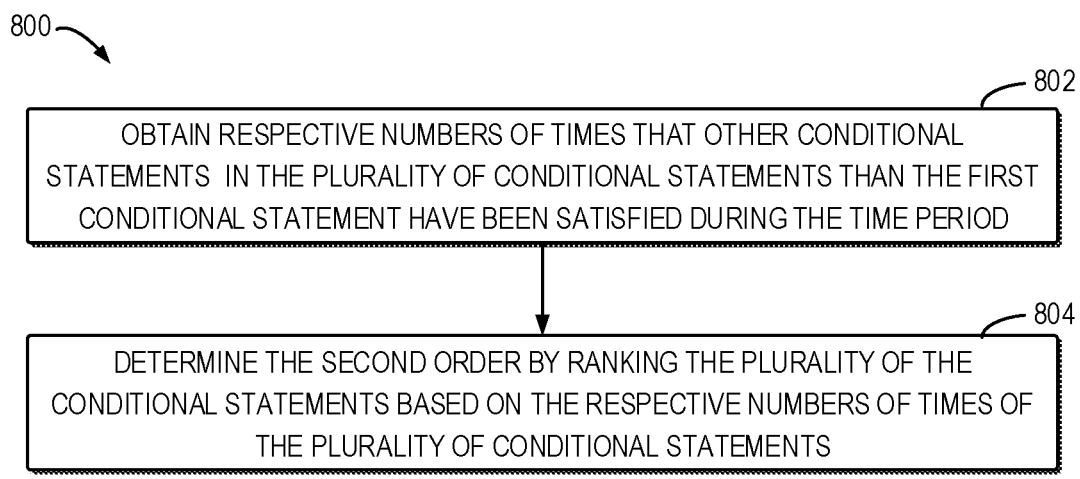
FIG. 8 depicts a flowchart of a method for determining a second order of the plurality of conditional statements according to an embodiment of the present disclosure.

In some further embodiments, the second order may be based on ranking. The step of block 506 will now be described in detail with reference to FIG. 8, which depicts a flowchart of a method 800 for determining a second order of the plurality of conditional statements 415 according to an embodiment of the present disclosure. As shown in FIG. 8, at block 802, the computing device 420 may obtain respective numbers of times that conditional statements in the plurality of conditional statements other than the first conditional statement have been satisfied during the execution. For example, the computing device 420 may record the number of times that each of the plurality of conditional statements 415 has been satisfied during the execution. At block 804, the computing device 420 may determine the second order by ranking the plurality of the conditional statements 415 based on the respective numbers of times of the plurality of conditional statements from high to low.

Continuing the example as shown in FIG. 4, the second order may be determined as conditional statement C 415-3, conditional statement D 415-4, conditional statement A 415-1 and conditional statement B 415-2 in sequence comprising conditional statement satisfactions of 1000, 500, 300, 200 respectively.

Alternatively, if the determination in block 504 is based on the comparison between the first number of times of the first conditional statement with a second number of times of a second conditional statement. The computing device 420 may determine the second order such that a conditional statement with a higher number of times of the first and second conditional statements precedes the other conditional statement in the second order. In particular, in response to a determination that the second number of times is less than the first number of times and the second conditional statement precedes to the first conditional statement in the plurality of conditional statements 415 compiled in the first order, the computing device 420 may determine the second order such that the first conditional statement is preceding to the second conditional statement in the second order. Similarly, in response to a determination that the second number of times is greater than the first number of times and the first conditional statement is preceding to the second conditional statement the plurality of conditional statements compiled in the first order, the computing device 420 may determine the second order such that the second conditional statement is preceding to the first conditional statement in the second order. For example, the computing device 420 may obtain the second order by exchanging a first position of the first conditional statement and a second position of the second conditional statement in the first order.

Referring back to FIG. 5, at block 508, the computing device 420 compiles the plurality of conditional statements 415 in the second order. In some embodiments, the computing device 420 may then recompile the plurality of conditional statements 415 by generating a new script bases on the new order and then compiling the new script to new machine code.

Alternatively, the computing device 420 may convert the plurality of conditional statements into a first intermediate representation according to the second order without modifying the script. The intermediate representation herein refers to an internal representation generated by a compiler, for example, GIMPLE or JIMPLE. The computing device 420 may then switch from a second intermediate representation, which is generated by compiling the plurality of conditional statements 415 in a first order during the execution, to the first intermediate representation. The computing device 420 may then process new incoming messages or command with the first intermediate representation. In this way, the computing device 420 may seamlessly switches to the new intermediate representation without affecting the processing of the incoming messages or commands. Embodiments of the plurality of conditional statements 415 can be automatically compiled based on the characteristics of the received messages during a predetermined time period, thereby improving performance for processing incoming messages.

In some embodiments, in response to the switching, the computing device 420 may mark the second intermediate representation as inactive rather than removing the second intermediate representation. A user or developer may not accept the determined new order and may want to reset to the order. In this case, in response to receiving an instruction for resetting an order for compiling the plurality of conditional statements, the computing device 420 may switch from the second intermediate representation to the first intermediate representation. In this way, computing device 420 provides an additional option for the user to dynamically reset the compiling order without the cost for recompiling.

Based on the method stated above, the solution according to embodiments of the present disclosure may dynamically compiling a plurality of conditional statements based on the number of times that the conditional statements have been satisfied during a predetermined time period, thereby improving the performance for processing messages or command with the plurality of conditional statements.

It should be noted that the processing of dynamical compiling (or achieved by computing device 420) according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving efficiency of processing messages by dynamically compiling conditional statements within a conditional statement list comprising:
   defining, by one or more processors of a messaging processing system, a list of conditional statements comprising a plurality of conditional statements in a first order and actions corresponding to the list in a script file;
   processing, by the one or more processors, incoming messages by executing a machine-executable program compiled from the script file:
   traversing, by the one or more processors, the conditional statements sequentially in the first order, identifying one or more conditional statements of the plurality of conditional statements corresponding to the incoming messages and performing corresponding actions from the list in the script file;
   recording, by the one or more processors, a number of times each conditional statement of the plurality of conditional statements is satisfied during the execution of the script file in the first order; and
   incrementing a respective number of times each time one of the conditional statements is satisfied during a time period;
   comparing, by the one or more processors, a first number of times that a first conditional statement of the plurality of conditional statements has been satisfied during execution of the script file for a time period to a threshold,
   in response to the first number of times being less than the threshold reordering, by the one or more processors, the list of conditional statements into a second order of the plurality of conditional statements, the second order being different from the first order; and
   compiling, by the one or more processors, the plurality of conditional statements in the second order;
   measuring, by the one or more processors, a measurement describing the first number of times that a first conditional statement of the plurality of conditional statements has been satisfied during execution.

2. The method of claim 1, wherein reordering further comprises:

obtaining, by the one or more processors, a relative position of the first conditional statement in the plurality of conditional statements compiled in the first order compared with a position of a beginning conditional statement compiled in the first order, wherein a distance between the relative position of the first conditional statement and the beginning conditional statement in the first order is compared to a first distance threshold;

reordering, by the one or more processors, whether the plurality of conditional statements based on the relative position and the measurement.

3. The method of claim 2, wherein the measurement is selected from the group consisting of a value of the first number of times, a frequency that the first conditional statement has been satisfied during the execution, and a ratio of the first number of times to a total number of times that the plurality of conditional statements have been satisfied during the execution.

4. The method of claim 2, further comprising:
in response to a determination that the first conditional statement is in a front position in the plurality of conditional statements compiled in the first order and that the measurement is less than the first distance threshold, reordering, by the one or more processors, the plurality of conditional statements into the second order; and
in response to a determination that the first conditional statement is in a rear position in the plurality of conditional statements compiled in the first order and that the measurement exceeds a second distance threshold, determining, by the one or more processors, that the plurality of conditional statements are to be reordered.

5. The method of claim 2, wherein comparing the relative position of the first conditional statement in the plurality of conditional statements compiled in the first order comprises:
in response to the distance between a first position of the first conditional statement and the position of a beginning conditional statement in the plurality of conditional statements compiled in the first order being below a first distance threshold, determining, by the one or more processors, that the relative position is in a front position in the plurality of conditional statements compiled in the first order; and
in response to a distance between the first position and a position of an end conditional statement in the plurality of conditional statements compiled in the first order being below a second distance threshold, determining, by the one or more processors, that the relative position is in a rear position in the plurality of conditional statements compiled in the first order.

6. The method of claim 1, further comprising:
obtaining, by the one or more processors, a second number of times that a second conditional statement of the plurality of conditional statements has been satisfied during the execution in the first order, the second conditional statement being different from the first conditional statement;
in response to a determination that the second number of times is less than the first number of times and the second conditional statement precedes the first conditional statement in the plurality of conditional statements compiled in the first order, determining, by the one or more processors, that the plurality of conditional statements are to be reordered; and in response to a determination that the second number of times is greater than the first number of times and the first conditional statement precedes the second conditional statement the plurality of conditional statements compiled in the first order, determining, by the one or more processors, that the plurality of conditional statements are to be reordered.

7. The method of claim 6, wherein the determining the second order comprises:
in response to a determination that the second number of times is less than the first number of times and the second conditional statement precedes the first conditional statement in the plurality of conditional statements compiled in the first order, determining, by the one or more processors, the second order such that the first conditional statement is preceding to the second conditional statement in the second order; and
in response to a determination that the second number of times is greater than the first number of times and the first conditional statement precedes the second conditional statement in the plurality of conditional statements compiled in the first order, determining, by the one or more processors, the second order such that the second conditional statement is preceding to the first conditional statement in the second order.

8. The method of claim 1, wherein the determining the second order comprises:
obtaining, by the one or more processors, respective numbers of times that one or more conditional statements in the plurality of conditional statements other than the first conditional statement have been satisfied during the execution; and
ranking, by the one or more processors, the second order of the plurality of the conditional statements based on the respective numbers of times the one or more conditional statements have been satisfied during the execution.

9. The method of claim 1, wherein the compiling the plurality of conditional statements in the second order comprises:
converting, by the one or more processors, the plurality of conditional statements into a first intermediate representation according to the second order.

10. The method of claim 9, wherein the plurality of conditional statements are compiled in the first order into a second intermediate representation during the execution, the method further comprising:
switching, by the one or more processors, from the second intermediate representation to the first intermediate representation.

11. The method of claim 10, the method further comprising:
in response to the switching, marking, by the one or more processors, the second intermediate representation as inactive; and
in response to receiving an instruction for resetting an order for compiling the plurality of conditional statements, switching, by the one or more processors, from the second intermediate representation to the first intermediate representation.

12. A message processing system for dynamically compiling conditional statements within a conditional statement list, the system comprising: one or more processors;
a memory coupled to at least one of the one or more processors;

a set of computer program instructions stored in the memory and executed by at least one of the one or more processors to perform actions of:

defining a list of conditional statements comprising a plurality of conditional statements in a first order and actions corresponding to the list in a script file;

processing incoming messages by executing a machine-executable program compiled from the script file;

traversing the conditional statements sequentially in the first order, identifying one or more conditional statements of the plurality of conditional statements corresponding to the incoming messages and performing corresponding actions from the list in the script file;

recording a number of times each conditional statement of the plurality of conditional statements is satisfied during the execution of the script file in the first order; and incrementing a respective number of times each time one of the conditional statements is satisfied during a time period;

a first number of times that a first conditional statement of the plurality of conditional statements has been satisfied during execution of the plurality of conditional statements script file for a time period to a threshold, in response to the first number of times being less than the threshold, a reordering, determining, the list of conditional statements into a second order of the plurality of conditional statements, the second order being different from the first order; and compiling the plurality of conditional statements in the second order;

measuring a measurement describing the first number of times that a first conditional statement of the plurality of conditional statements has been satisfied during execution.

13. The system of claim 12, wherein reordering further comprises:

a relative position of the first conditional statement in the plurality of conditional statements compiled in the first order compared with a position of a beginning conditional statement compiled in the first order, wherein a distance between the relative position of the first conditional statement and the beginning conditional statement in the first order is compared to a first distance threshold;

reordering the plurality of conditional statements, based on the relative position and the measurement.

14. The system of claim 13, wherein the measurement is selected from the group consisting of a value of the first number of times, a frequency that the first conditional statement has been satisfied during the execution, and a ratio of the first number of times to a total number of times that the plurality of conditional statements have been satisfied during the execution.

15. The system of claim 13, further comprising:

in response to a determination that the first conditional statement is in a front position in the plurality of conditional statements compiled in the first order and that the measurement is below the first distance threshold, reordering the plurality of conditional statements into the second order; and in response to a determination that the first conditional statement is in a rear position in the plurality of conditional statements compiled in the first order and that the measurement exceeds a second distance threshold, determining that the plurality of conditional statements are to be reordered.

16. The system of claim 13, wherein comparing the relative position of the first conditional statement in the plurality of conditional statements compiled in the first order comprises:

in response to the distance between a first position of the first conditional statement and the position of a beginning conditional statement in the plurality of conditional statements compiled in the first order being below a first distance threshold, determining that the relative position is in a front position in the plurality of conditional statements compiled in the first order; and in response to a distance between the first position and a position of an end conditional statement in the plurality of conditional statements compiled in the first order being below a second distance threshold, determining that the relative position is in a rear position in the plurality of conditional statements compiled in the first order.

17. The system of claim 12, further comprising:

obtaining a second number of times that a second conditional statement of the plurality of conditional statements has been satisfied during the execution, the second conditional statement being different from the first conditional statement;

in response to a determination that the second number of times is less than the first number of times and the second conditional statement precedes the first conditional statement in the plurality of conditional statements compiled in the first order, determining that the plurality of conditional statements are to be reordered; and in response to a determination that the second number of times is greater than the first number of times and the first conditional statement precedes the second conditional statement the plurality of conditional statements compiled in the first order, determining that the plurality of conditional statements are to be reordered.

18. The system of claim 17, wherein the determining of the second order comprises:

in response to a determination that the second number of times is less than the first number of times and the second conditional statement precedes the first conditional statement in the plurality of conditional statements compiled in the first order, determining the second order such that the first conditional statement is preceding to the second conditional statement in the second order; and in response to a determination that the second number of times is greater than the first number of times and the first conditional statement precedes the second conditional statement in the plurality of conditional statements compiled in the first order, determining the second order such that the second conditional statement is preceding to the first conditional statement in the second order.

19. The system of claim 12, wherein the determining the second order comprises:

obtaining respective numbers of times that one or more conditional statements in the plurality of conditional statements other than the first conditional statement have been satisfied during the execution; and ranking the second order of the plurality of the conditional statements based on the respective numbers of times the one or more conditional statements have been satisfied during the execution.

20. A computer program product for dynamically compiling conditional statements within a conditional statement list comprising:
   one or more computer readable storage media having computer program instructions stored on the computer-readable storage media, said program instructions executes a computer implemented method comprising the steps of:
   defining a list of conditional statements comprising a plurality of conditional statements in a first order and actions corresponding to the list in a script file;
   processing incoming messages by executing a machine-executable program compiled from the script file;
   traversing the conditional statements sequentially in the first order, identifying one or more conditional statements of the plurality of conditional statements corresponding to the incoming messages and performing corresponding actions from the list in the script file;
   recording a number of times each conditional statement of the plurality of conditional statements is satisfied during the execution of the script file in the first order; and
   incrementing a respective number of times each time one of the conditional statements is satisfied during a time period;
   comparing a first number of times that a first conditional statement of the plurality of conditional statements has been satisfied during execution of the script file for a time period to a threshold,
   in response to the first number of times being less than the threshold, reordering the list of conditional statements into a second order of the plurality of conditional statements, the second order being different from the first order; and
   compiling the plurality of conditional statements in the second order;
   measuring, by the one or more processors, a measurement describing the first number of times that a first conditional statement of the plurality of conditional statements has been satisfied during execution.

* * * * *